(12) United States Patent
Aydin et al.

(10) Patent No.: US 7,041,720 B2
(45) Date of Patent: May 9, 2006

(54) PRESSURE SENSITIVE ADHESIVES COMPRISING SILICON COMPOUNDS

(75) Inventors: Oral Aydin, Manheim (DE); Andree Dragon, Speyer (DE); Heiko Diehl, St. Martin (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 14 days.

(21) Appl. No.: 10/824,468

(22) Filed: Apr. 15, 2004

(65) Prior Publication Data
US 2004/0235995 A1 Nov. 25, 2004

(30) Foreign Application Priority Data
May 20, 2003 (DE) ................................ 103 23 048

(51) Int. Cl.
*C08K 5/5419* (2006.01)
*C08K 3/34* (2006.01)
(52) U.S. Cl. ...................... 524/267; 524/269; 524/272; 524/442; 428/355 AC
(58) Field of Classification Search ......... 428/355 AC, 428/343; 524/267, 269, 272, 442
See application file for complete search history.

(56) References Cited

U.S. PATENT DOCUMENTS

| 3,314,838 | A | * | 4/1967 | Erwin | ..................... 156/71 |
| 4,322,516 | A | * | 3/1982 | Wiest et al. | ............. 526/307.7 |
| 6,369,153 | B1 | | 4/2002 | Guerin et al. | |
| 2001/0021452 | A1 | * | 9/2001 | Kishioka et al. | ............ 428/343 |

FOREIGN PATENT DOCUMENTS

DE 102 088 43 9/2003

OTHER PUBLICATIONS

Derwent Publications, AN 1999-591297, XP-002291701, JP 2000-212527, Aug. 2, 2000.

* cited by examiner

Primary Examiner—Melanie Bissett
(74) Attorney, Agent, or Firm—Oblon, Spivak, McClelland, Maier & Neustadt, P.C.

(57) ABSTRACT

A pressure sensitive adhesive comprising an aqueous dispersion of a polymer, said dispersion comprising, besides the polymer, silicon compounds selected from polymeric silicates, water-soluble alkali metal silicates (waterglass), silanes, and silicones obtainable from the silanes by condensation.

15 Claims, No Drawings

PRESSURE SENSITIVE ADHESIVES COMPRISING SILICON COMPOUNDS

The invention relates to a pressure sensitive adhesive comprising an aqueous dispersion of a polymer, said dispersion comprising, besides the polymer, silicon compounds selected from polymeric silicates, water-soluble alkali metal silicates (waterglass), silanes, and silicones obtainable from the silanes by condensation.

In pressure sensitive adhesives (PSAs) there is a desire both for high tack (adhesion) and high cohesion, i.e., high internal cohesiveness in the adhesive layer.

One known way of improving the adhesion is to use polymeric binders which contain monomers having long side chains. Substances known as tackifiers are also admixed for the purpose of improving the adhesion.

In general, however, such measures have the effect of impairing the cohesion.

DE-A 10208843 (PF 53298) discloses the addition of silica to radiation-crosslinkable polymers.

It is an object of the present invention to improve the adhesion of the PSAs without detracting from the cohesion. A particular aim is that these advantageous properties should be obtained even in the case of adhesive bonds to apolar surfaces.

We have found that this object is achieved by the pressure sensitive adhesive defined at the outset.

The PSA comprises an aqueous polymer dispersion. The polymer dispersed in the aqueous dispersion is obtainable by free-radical polymerization of ethylenically unsaturated compounds (monomers).

The polymer is composed of at least 40% by weight, preferably at least 60% by weight, with particular preference at least 80% by weight, of what are known as principal monomers.

The principal monomers are selected from $C_1$–$C_{20}$ alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing from 1 to 10 carbon atoms, aliphatic hydrocarbons having from 2 to 8 carbon atoms and one or two double bonds, and mixtures of these monomers.

Examples include (meth)acrylic acid alkyl esters with a $C_1$–$C_{10}$ alkyl radical, such as methyl methacrylate, methyl acrylate, n-butyl acrylate, ethyl acrylate, and 2-ethylhexyl acrylate.

In particular, mixtures of the (meth)acrylic acid alkyl esters are also suitable.

Examples of vinyl esters of carboxylic acids having from 1 to 20 carbon atoms include vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably, styrene. Examples of nitriles include acrylonitrile and methacrylonitrile.

The vinyl halides are ethylenically unsaturated compounds substituted by chlorine, fluorine or bromine, preferably vinyl chloride and vinylidene chloride.

Examples of vinyl ethers include vinyl methyl ether and vinyl isobutyl ether. Preference is given to vinyl ethers of alcohols containing from 1 to 4 carbon atoms.

Hydrocarbons that may be mentioned that have from 2 to 8 carbon atoms and one or two olefinic double bonds include ethylene, propylene, butadiene, isoprene, and chloroprene.

Preferred principal monomers are the $C_1$ to $C_{10}$ alkyl acrylates and methacrylates, especially $C_1$ to $C_8$ alkyl acrylates and methacrylates, and vinylaromatics, especially styrene, and mixtures thereof.

Very particular preference is given to methyl acrylate, methyl methacrylate, ethyl acrylate, n-butyl acrylate, n-hexyl acrylate, octyl acrylate, and 2-ethylhexyl acrylate, styrene, and mixtures of these monomers.

Besides the principal monomers the polymer may include further monomers, e.g., monomers containing carboxylic, sulfonic or phosphonic acid groups. Carboxylic acid groups are preferred. Examples that may be mentioned include acrylic acid, methacrylic acid, itaconic acid, maleic acid, and fumaric acid.

Examples of further monomers are monomers also containing hydroxyl groups, especially $C_1$–$C_{10}$ hydroxyalkyl (meth)acrylates, and (meth)acrylamide.

Further monomers that may be mentioned additionally include phenyloxyethyl glycol mono(meth)acrylate, glycidyl acrylate, glycidyl methacrylate, and amino (meth) acrylates such as 2-aminoethyl (meth)acrylate.

Crosslinking monomers are further additional monomers that may be mentioned.

With particular preference the polymer is composed of at least 40% by weight, in particular at least 60% by weight, and with very particular preference at least 80% by weight, of $C_1$–$C_{20}$, especially $C_1$–$C_{10}$, alkyl (meth)acrylates.

In one preferred embodiment the polymers are prepared by emulsion polymerization, and are therefore emulsion polymers.

Alternatively, preparation may take place by solution polymerization, for example, with subsequent dispersion in water.

In the case of the emulsion polymerization, ionic and/or nonionic emulsifiers and/or protective colloids and/or stabilizers are used as surface-active compounds.

A detailed description of suitable protective colloids can be found in Houben-Weyl, Methoden der organischen Chemie, volume XIV/1, Makromolekulare Stoffe, Georg-Thieme-Verlag, Stuttgart, 1961, pp. 411 to 420. Suitable emulsifiers include anionic, cationic, and nonionic emulsifiers. As accompanying surface-active substances it is preferred to employ exclusively emulsifiers, whose molecular weights, unlike those of the protective colloids, are usually below 2000 g/mol. Where mixtures of surface-active substances are used, the individual components must of course be compatible with one another; in case of doubt, this can be checked by means of a few preliminary tests. As surface-active substances it is preferred to use anionic and nonionic emulsifiers. Examples of customary accompanying emulsifiers are ethoxylated fatty alcohols (EO units: 3 to 50, alkyl: $C_8$ to $C_{36}$), ethoxylated mono-, di-, and trialkylphenols (EO units: 3 to 50, alkyl: $C_4$ to $C_9$), alkali metal salts of dialkyl esters of sulfosuccinic acid, and alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Further suitable emulsifiers are compounds of the formula II

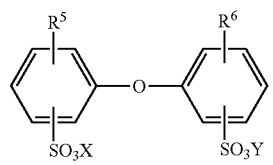

(II)

where $R^5$ and $R^6$ are hydrogen or $C_4$ to $C_{14}$ alkyl but are not simultaneously hydrogen, and X and Y can be alkali metal ions and/or ammonium ions. Preferably, $R^5$ and $R^6$ are linear or branched alkyl radicals having from 6 to 18 carbon atoms or hydrogen, and in particular have 6, 12 or 16 carbon atoms, and $R^5$ and $R^6$ are not both simultaneously hydrogen. X and Y are preferably sodium, potassium or ammonium ions, sodium being particularly preferred. Particularly advantageous compounds II are those in which X and Y are sodium, $R^5$ is a branched alkyl radical having 12 carbon atoms, and $R^6$ is hydrogen or $R^5$. Use is frequently made of technical-grade mixtures containing a fraction of from 50 to 90% by weight of the monoalkylated product, an example being Dowfax® 2A1 (trademark of Dow Chemical Company).

Suitable emulsifiers can also be found in Houben-Weyl, op. cit., volume 14/1, pages 192 to 208.

Examples of emulsifier tradenames are Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, and Emulphor NPS 25.

The surface-active substance is customarily used in amounts of from 0.1 to 10% by weight, based on the monomers to be polymerized.

Water-soluble initiators for the emulsion polymerization are, for example, ammonium salts and alkali metal salts of peroxodisulfuric acid, e.g., sodium peroxodisulfate, hydrogen peroxide or organic peroxides, e.g., tert-butyl hydroperoxide.

Also suitable are systems known as reduction-oxidation (redox) initiator systems.

The redox initiator systems are composed of at least one, generally inorganic, reducing agent and an organic or inorganic oxidizing agent.

The oxidizing component comprises, for example, the emulsion polymerization initiators already mentioned above.

The reducing components comprise, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may be used in conjunction with soluble metal compounds whose metallic component is able to exist in a plurality of valence states.

Examples of customary redox initiator systems are ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component for example, may also be mixtures: for example, a mixture of the sodium salt of hydroxymethanesulfinic acid with sodium disulfite.

The stated compounds are generally employed in the form of aqueous solutions, the lower concentration being determined by the amount of water that is acceptable in the dispersion and the upper concentration by the solubility in water of the compound in question. In general, the concentration is from 0.1 to 30% by weight, preferably from 0.5 to 20% by weight, with particular preference from 1.0 to 10% by weight, based on the solution.

The amount of the initiators is generally from 0.1 to 10% by weight, preferably from 0.5 to 5% by weight, based on the monomers to be polymerized. It is also possible for two or more different initiators to find use in the context of the emulsion polymerization.

For the polymerization it is possible to use regulators, in amounts for example of from 0 to 0.8 part by weight, based on 100 parts by weight of the monomers to be polymerized, the function of said regulators being to reduce the molar mass. Suitable, for example, are compounds containing a thiol group such as tert-butyl mercaptan, thioglycolic acid ethyl acrylic esters, mercaptoethynol, mercaptopropyltrimethoxysilane or tert-dodecyl mercaptan.

The emulsion polymerization takes place in general at from 30 to 130° C., preferably from 50 to 90° C. The polymerization medium may consist either of water alone or of mixtures of water and water-miscible liquids such as methanol. Preferably, water alone is used. The emulsion polymerization can be conducted either as a batch operation or in the form of a feed process, including stages or gradient procedures. Preference is given to the feed process, in which a portion of the polymerization batch is introduced as the initial charge, is heated to the polymerization temperature, and is subjected to partial polymerization, and then the remainder of the polymerization batch is supplied to the polymerization zone continuously, in stages or under a concentration gradient, normally by way of two or more spatially separate feed streams, of which one or more contain the monomers as they are or in emulsified form, the polymerization being maintained during this addition. The initial polymerization charge may also include a polymer seed with the aim, for example, of setting the particle size more effectively.

The manner in which the initiator is added to the polymerization vessel in the course of the free-radical aqueous emulsion polymerization is known to the skilled worker. It may either be included in its entirety in the initial charge to the polymerization vessel or else introduced, continuously or in stages, at the rate at which it is consumed in the course of the free-radical aqueous emulsion polymerization. In each individual case this will depend both on the chemical nature of the initiator system and on the polymerization temperature. Preferably, part is included in the initial charge and the remainder is supplied to the polymerization zone at the rate at which it is consumed.

In order to remove the residual monomers it is common to add initiator after the end of the actual emulsion polymerization as well, i.e., after a monomer conversion of at least 95%.

In the case of the feed process the individual components can be added to the reactor from above, at the side, or from below, through the reactor floor.

In the case of emulsion polymerization, aqueous polymer dispersions with solids contents of generally from 15 to 75% by weight, preferably from 40 to 75% by weight, are obtained.

For a high space/time yield of the reactor, dispersions with as high as possible a solids content are preferred. In order to be able to obtain solids contents >60% by weight, a bimodal or polymodal particle size should be established, since otherwise the viscosity becomes too high and the dispersion can no longer be handled. Producing a new particle generation can be done, for example, by adding seed (EP 81083), by adding excess quantities of emulsifier, or by adding miniemulsions. A further advantage associated with the low viscosity at high solids content is the improved coating behavior. One or more new particle generations can be produced at any desired point in time, guided by the target particle size distribution for a low viscosity.

The polymer thus prepared is used preferably in the form of its aqueous dispersion.

The glass transition temperature of the (emulsion) polymer is preferably from −60 to 0° C., with particular preference from −60 to −10° C., and with very particular preference from −60 to −20° C.

The glass transition temperature can be determined by standard methods such as differential thermoanalysis or differential scanning calorimetry (see, for example, ASTM 3418/82, midpoint temperature).

In accordance with the invention the aqueous polymer dispersion comprises silicon compounds selected from polymeric silicates, water-soluble alkali metal silicates, silanes, and silicones obtainable from the silanes by condensation.

The polymeric silicates, are, in particular, polymeric silicon dioxide such as is obtainable by condensing silica or, preferably, water-soluble alkali metal silicates (waterglass).

The water-soluble alkali metal silicates can be, for example, aqueous solutions of alkali metal silicates, e.g., potassium waterglass (obtainable by dissolving a melt of quartz sand with potash) or sodium waterglass (obtainable by dissolving a melt of quartz sand and soda).

The silanes are silicon compounds having organic substituents on the silicon atom.

Preference is given to silanes which are able to undergo condensation to silicones and which for that purpose have in particular one or more alkoxy groups as substituent on the silicon atom.

The silanes in question are preferably those having a molar weight of less than 2000 g/mol, in particular less than 1000 g/mol.

The silanes are in particular those of the formula

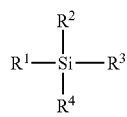

where $R^1$ to $R^4$ independently are each an organic radical, with the proviso that at least one of the groups $R^1$–$R^4$ is an alkoxy group, especially a $C_1$–$C_8$ alkoxy group, preferably a $C_1$–$C_4$ alkoxy group. With particular preference two, three or all of the groups $R^1$ to $R^4$ are an alkoxy group.

Especially preferred alkoxy groups are the methoxy group and ethoxy group.

The remaining groups are some other organic radical, in particular an organic radical which can contain up to 20 carbon atoms and can if desired contain heteroatom, such as O, N, S. Particularly suitable are alkyl groups, especially $C_1$–$C_{20}$, particularly $C_1$–$C_{10}$, alkyl groups.

In one particularly preferred embodiment the silane contains, besides the alkoxy group, at least one further hydrophilic groups, selected from hydroxyl, epoxy, carboxyl, mercapto, and amino groups. Besides alkoxy groups the silanes preferably contain from one to four, especially one or two, of said hydrophilic groups.

Preference is given to amino groups, especially primary or secondary amino groups, with particular preference primary amino groups (—$NH_2$).

The further hydrophilic groups are preferably attached to the organic radicals $R^1$–$R^4$. They are in particular alkyl groups which are substituted by the hydrophilic group.

Examples of suitable compounds include mono-, di-, and trialkoxysilanes, where the other radicals are organic groups, especially alkyl groups, of which at least one is substituted by one or more, e.g., two, hydrophilic groups.

An example that may be mentioned is 4-amino-3,3-dimethylbutyltrimethoxysilane.

Suitable silicon compounds further include silicones which are obtainable by condensing silanes, particularly the above silanes.

Preferred silicon compounds are the water-soluble alkali silicates and also the silanes containing further hydrophilic groups.

The silanes containing further hydrophilic groups are particularly preferred.

Mixtures of different silicon compounds are also suitable.

The amount of silicon compounds present is preferably at least 0.0001, in particular at least 0.05, very preferably at least 0.1 or at least 0.5 part by weight, the amount of silicon compounds present is preferably not more than 10 parts by weight, with particular preference not more than 5 parts by weight, very preferably not more than 3 parts by weight, based in each case on 100% by weight of the polymer dispersed in the dispersion.

The silicon compounds can be added to the aqueous polymer dispersion at any time. In principle they may also be present before or during the polymerization of the monomers, although it is preferred to add them after the polymerization has ended.

In one preferred embodiment the silicon compounds are first predispersed in water and the dispersion of silicon compounds obtained is then added to the polymer dispersion.

In that case the alkali metal silicates form polymeric silicates and the silanes form silicones. It is assumed that the silicon compounds within the polymer dispersion are ultimately present in the form of discrete particles, having a diameter in particular of from 5 to 200 nm, preferably from 5 to 100 nm.

The pressure sensitive adhesive can comprise, besides the aqueous polymer dispersion, further additives. For example, a tackifier, i.e., a tackifying resin, can be added to the aqueous dispersion. Tackifiers are known, for example, from Adhesives Age, July 1987, pages 19–23 or Polym. Mater. Sci. Eng. 61 (1989), pages 588–592.

Tackifiers are, for example, natural resins, such as rosins and their derivatives resulting from disproportionation or isomerization, polymerization, dimerization and/or hydrogenation. They may be present in their salt form (with monovalent or polyvalent counterions (cations), for example), or, preferably, in their esterified form. Alcohols used for the esterification may be monohydric or polyhydric. Examples are methanol, ethanediol, diethylene glycol, triethylene glycol, 1,2,3-propanetriol, and pentaerythritol.

Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene.

Further compounds increasingly being used as tackifiers are polyacrylates of low molar weight. These polyacrylates preferably have a weight-average molecular weight $M_w$ of less than 30,000. The polyacrylates are preferably composed of at least 60% by weight, in particular at least 80% by weight, of $C_1$–$C_8$ alkyl (meth)acrylates.

Preferred tackifiers are natural or chemically modified rosins. Rosins consist predominantly of abietic acid or its derivatives.

The tackifiers can be added in a simple way to the polymers of the invention, preferably to the aqueous dispersions of the polymers. The tackifiers are preferably themselves in the form of an aqueous dispersion.

The amount by weight of the tackifiers is preferably from 5 to 100 parts by weight, with particular preference from 10 to 50 parts by weight, per 100 parts by weight of polymer (solids/solids).

Besides tackifiers it is also possible for other additives, such as thickeners, preferably associative thickeners, defoamers, plasticizers, pigments, wetting agents or fillers, to be used in the case of the PSA utility. In addition to the aqueous polymer dispersion, therefore, the pressure sensitive adhesives of the invention further comprise, where appropriate, tackifiers and/or the abovementioned additives.

For better surface wetting, the pressure sensitive adhesives may in particular comprise wetting aids, e.g., fatty alcohol ethoxylates, alkylphenol ethoxylates, sulfosuccinic esters, nonylphenol ethoxylates, polyoxyethylenes/-propylenes or sodium dodecylsulfonates. The amount is generally from 0.05 to 5 parts by weight, in particular from 0.1 to 3 parts by weight, per 100 parts by weight of polymer (solids).

The pressure sensitive adhesives are suitable for producing self-adhesive articles such as labels, sheets or tapes. The PSA may be applied by customary methods, e.g., by rolling, knife coating, spreading, etc., to carriers, e.g., paper or polymer films, preferably composed of polyethylene, polypropylene, which may have been biaxially or monoaxially oriented, polyethylene terephthalate, polyvinyl chloride, polystyrene, polyamide, or metal. Particularly suitable carriers are those having apolar surfaces, e.g., of polyolefins, especially polyethylene or polypropylene, since the dispersions of the invention adhere well to such surfaces. The water can be removed preferably by drying at from 50 to 150° C. Before or after the adhesive has been applied, the carriers can be cut to give tapes, labels or sheets. For subsequent use, the PSA-coated side of the substrates may be lined with a release paper, e.g., with a siliconized paper.

The self-adhesive articles of the invention have very good adhesive properties, including in particular a good adhesion to the substrates and a high cohesion (internal strength in the adhesive layer). These good properties are obtained even when the dispersions or pressure sensitive adhesives comprise wetting aids. They also have good adhesion to apolar surfaces and are therefore particularly suitable for substrates having apolar surfaces, e.g., polyolefin surfaces, e.g., polyethylene (HDPE or LDPE) or polypropylene.

Furthermore, the PSA shows no tendency to transfer; that is, it remains on the carrier after the label, for example, has been removed.

The self-adhesive articles also have a high water resistance.

EXAMPLES

Ingredients:

Acronale® A 220 and: aqueous dispersion of a polyacrylate,

Acronal V215: which is offered as a pressure-sensitive adhesive (BASF)

Lumiten® I-SC: wetting aid (sulfosuccinic ester)

Lumiten® I-SC and potassium waterglass and/or a silane were added to the Acronal® A 220 in the amounts indicated in the tables. The amounts by weight are parts by weight per 100 parts by weight of polymer.

Performance Testing

The PSAs were applied at a rate of 19 or 18 g/m² to polyethylene film or paper carriers and dried at 90° C. for 3 minutes.

Thereafter the peel strength (adhesion) and shear strength (cohesion) were determined.

The PSA-coated carrier was cut into test strips 25 mm wide. In order to determine the shear strength the test strips were bonded with a bond area of 12.5 mm² to steel or with a bond area of 25 mm² to glass, rolled down once using a 1 kg roller, stored for 10 minutes (under standard conditions, 50% relative humidity, 1 bar, 23° C.) and then loaded with a 1 kg or 1.5 kg hanging weight (under standard conditions). The measure of the shear strength was the time in hours taken for the weight to fall off; in each case, the average was calculated from 5 measurements.

For determining the peel strength (adhesion), a test strip 2.5 cm wide was bonded to a polyethylene (HDPE) or steel test specimen and rolled down once using a 1 kg roller. One end was then clamped into the upper jaws of a tension/elongation test apparatus. The adhesive strip was removed from the test area at an angle of 180° and a speed of 300 mm/min; that is, the adhesive strip was bent over and pulled off parallel to the metal test plate, and the force required to achieve this was recorded. The measure of the peel strength was the force, in N/2.5 cm, which resulted as the average from five measurements.

The peel strength was determined 24 hours after adhesive bonding. After this time, the bond strength has fully developed.

The test methods correspond essentially to the Finat test methods (FTM) Nos. 1 and 8.

TABLE 1

Application rate: 18 g/m²
Carrier: Paper

| PSA | Peel strength on steel | Shear strength on steel |
|---|---|---|
| Acronal ® V 215 1 part by weight Lumiten ® I SC 1 part by weight potassium waterglass* | 19.5 | 5.3 |
| Acronal ® V 215 1 part by weight Lumiten ® I SC 2 parts by weight potassium waterglass* | 18.7 | 10.4 |
| Acronal ® V 215 1 part by weight Lumiten ® I SC 3 parts by weight potassium waterglass* | 21.2 | 13.0 |

*Betolin K 28, manufactured by Woellner Ludwigshafen

TABLE 2

Application rate: 19 g/m²
Carrier: Polyethylene

| PSA | Peel strength on polyethylene | Shear strength on steel |
|---|---|---|
| Acronal ® A 220 1 part by weight Lumiten ® I SC | 5.8 | 16.0 |
| Acronal ® A 220 1 part by weight Lumiten ® I SC 0.1 part by weight N-(3-trimethoxy-silylpropyl)ethylenediamine | 5.6 | 36.0 |
| Acronal ® A 220 1 part by weight Lumiten ® I SC 0.5 part by weight N-(3-trimethoxy-silylpropyl)ethylenediamine | 6.9 | 76.0 |
| Acronal ® A 220 1 part by weight Lumiten ® I SC 1 part by weight N-(3-trimethoxy-silylpropyl)ethylenediamine | 7.0 | 94.0 |

TABLE 3

Application rate: 19 g/m²
Carrier: Polyethylene

| PSA | Peel strength on polyethylene | Shear strength on glass |
|---|---|---|
| Acronal ® A 220 1 part by weight Lumiten ® I SC | 5.8 | 16.0 |
| Acronal ® A 220 1 part by weight Lumiten ® I SC 0.1 part by weight 4-amino-3,3-dimethylbutyltrimethoxysilane | 6.3 | 67.0 |
| Acronal ® A 220 1 part by weight Lumiten ® I SC 0.5 part by weight 4-amino-3,3-dimethylbutyltrimethoxysilane | 6.7 | 131.0 |

TABLE 4

Application rate: 19 g/m²
Carrier: Polyethylene

| PSA | Peel strength on polyethylene | Shear strength on glass |
|---|---|---|
| Acronal ® A 220 1 part by weight Lumiten ® I SC | 5.8 | 16.0 |
| Acronal ® A 220 1 part by weight Lumiten ® I SC 0.1 part by weight tetraethoxysilane | 5.7 | 14.0 |
| Acronal ® A 220 1 part by weight Lumiten ® I SC 0.5 part by weight tetraethoxysilane | 5.7 | 12.5 |
| Acronal ® A 220 1 part by weight Lumiten ® I SC 1 part by weight tetraethoxysilane | 5.6 | 13.0 |

We claim:

1. A pressure sensitive adhesive comprising an aqueous dispersion of a polymer, said dispersion comprising, besides the polymer, at least one silicon compound selected from the group consisting of polymeric silicates, water-soluble alkali metal silicates (waterglass), silanes, and silicones obtained from the silanes by condensation and wherein the silicon compound is in the form of discrete particles having a weight-average diameter of from 5 to 200 nanometers.

2. The pressure sensitive adhesive as claimed in claim 1, wherein said silicon compound is an aqueous solution of alkali metal silicates (waterglass).

3. The pressure sensitive adhesive as claimed in claim 1, wherein said silicon compound is a silane having alkoxy groups which can be condensed to silicones.

4. The pressure sensitive adhesive as claimed in claim 3, wherein the silane contains, besides the alkoxy groups, at least one hydrophilic group selected from the group consisting of hydroxyl, epoxy, carboxyl, mercapto, and amino groups.

5. The pressure sensitive adhesive as claimed in claim 4, wherein said hydrophilic groups are amino groups.

6. The pressure sensitive adhesive as claimed in claim 1, containing from 0.001 to 10 parts by weight of said silicon compound per 100 parts by weight of the polymer dispersed in said dispersion.

7. The pressure sensitive adhesive as claimed in claim 1, obtained by dispersing the silicon compound in the aqueous dispersion of the polymer.

8. The pressure sensitive adhesive as claimed in claim 1, obtained by predispersing the silicon compound in water and then adding the predispersed silicon compound to the aqueous dispersion of the polymer.

9. The pressure sensitive adhesive as claimed in claim 1, wherein said polymer is composed of at least 40% by weight of principal monomers selected from C1 to C20 alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing from 1 to 10 carbon atoms, aliphatic hydrocarbons having from 2 to 8 carbon atoms and two double bonds, or mixtures of these monomers.

10. The pressure sensitive adhesive as claimed in claim 1, wherein the polymer is composed of at least 40% by weight of C1 to C20 alkyl (meth)acrylates.

11. The pressure sensitive adhesive as claimed in claim 1, wherein said polymer is an emulsion polymer.

12. The pressure sensitive adhesive as claimed in claim 1, wherein the glass transition temperature of said polymer is from −60 to 0° C.

13. A self-adhesive article comprising the pressure sensitive adhesive as claimed in claim 1.

14. The self-adhesive article as claimed in claim 13 wherein said self-adhesive article is a label, an adhesive tape or an adhesive sheet.

15. A method for producing the self-adhesive article as claimed in claim 13 comprising applying said aqueous dispersion of a polymer to said article as a pressure sensitive adhesive.

* * * * *